(12) United States Patent
Eriksson

(10) Patent No.: US 9,649,694 B2
(45) Date of Patent: May 16, 2017

(54) TOOLHOLDER WITH INSERT CLAMP AND METHOD FOR CHANGING CUTTING INSERTS ON A TOOLHOLDER

(71) Applicant: SECO TOOLS AB, Fagersta (SE)

(72) Inventor: Roger Eriksson, Fagersta (SE)

(73) Assignee: SECO TOLLS AB, Fagersta (SE)

( * ) Notice: Subject to any disclaimer, the term of this patent is extended or adjusted under 35 U.S.C. 154(b) by 57 days.

(21) Appl. No.: 14/434,464

(22) PCT Filed: Oct. 7, 2013

(86) PCT No.: PCT/EP2013/070796
§ 371 (c)(1),
(2) Date: Apr. 9, 2015

(87) PCT Pub. No.: WO2014/056830
PCT Pub. Date: Apr. 17, 2014

(65) Prior Publication Data
US 2015/0231704 A1    Aug. 20, 2015

(30) Foreign Application Priority Data
Oct. 11, 2012   (EP) ..................................... 12188189

(51) Int. Cl.
*B23B 27/16*    (2006.01)

(52) U.S. Cl.
CPC .... *B23B 27/1677* (2013.01); *B23B 2205/045* (2013.01); *B23B 2260/03* (2013.01); *B23B 2260/096* (2013.01); *B23B 2260/106* (2013.01); *B23B 2260/136* (2013.01); *Y10T 29/49817* (2015.01); *Y10T 407/22* (2015.01); *Y10T 407/2274* (2015.01)

(58) Field of Classification Search
CPC ............ B23B 27/1677; B23B 2205/04; B23B 2205/045; B23B 2260/03; B23B 2260/096; B23B 2260/136; B23B 2260/0785; B23B 2270/08; B23B 2270/09
See application file for complete search history.

(56) References Cited

U.S. PATENT DOCUMENTS 7,153,069 B1 * 12/2006 Van Horssen ...... B23B 27/1662
407/107
2011/0211923 A1    9/2011 Yoffe

FOREIGN PATENT DOCUMENTS

| CN | 101193725 A | 6/2008 |
| FR | 2327838 A1 | 5/1977 |
| WO | 2006133378 A2 | 12/2006 |

* cited by examiner

*Primary Examiner* — Sunil K Singh
*Assistant Examiner* — Alan Snyder
(74) *Attorney, Agent, or Firm* — Corinne R. Gorski

(57) ABSTRACT

A toolholder and method for use with a cutting insert having a clamping opening, comprising a toolholder body and a clamp pivotably mounted to and contacting the toolholder body and pivotable between a first position in which a protrusion of the clamp is disposed in a position in which it is arranged to be received in the clamping opening in the cutting insert to secure the cutting insert to the toolholder body and a second position in which the protrusion is spaced, relative to the toolholder, upwardly from the first position so that the cutting insert is not secured to the toolholder body by the protrusion. A resilient member is arranged relative to the clamp to urge the clamp to the first position and to resist pivoting of the clamp to the second position. An opening in the clamp may receive a portion of a separate lever.

10 Claims, 5 Drawing Sheets

TOOLHOLDER WITH INSERT CLAMP AND METHOD FOR CHANGING CUTTING INSERTS ON A TOOLHOLDER

RELATED APPLICATION DATA

This application is a §371 National Stage Application of PCT International Application No. PCT/EP2013/070796 filed Oct. 7, 2013 claiming priority of EP Application No. 12188189.0, filed Oct. 11, 2012.

BACKGROUND AND SUMMARY

The present invention relates generally to cutting tools and more particularly to toolholders with clamping arrangements for clamping a replaceable cutting insert relative to the toolholder.

Replaceable and/or indexable cutting inserts are ordinarily secured to toolholders in recesses intended for the cutting inserts by clamp arrangements. The clamping arrangements are typically in the form of a screw or bolt that extends through a through hole in the cutting insert and mates with an internally threaded hole in the toolholder, or in the form of a clamping arm that contacts a surface of the insert to secure it to the toolholder.

A type of clamping arm is secured to a toolholder by a nut and bolt arrangement that connects the clamping arm to the toolholder body. Usually, an end of the clamping arm contacts the cutting insert, such as by extending into a recess in a top surface of the insert to prevent the insert from inadvertently becoming separated from the toolholder. In such an arrangement, to install a cutting insert, the nut and bolt must be loosened relative to each other sufficiently to permit the insert to be inserted under the end of the clamping arm that will secure the cutting insert to the tool holder. Until the nut and bolt are tightened sufficiently, the insert may fall out of the recess on the toolholder. This can be complicated by the possibility that the insert will have to be installed in an inconvenient location, making it necessary to hold the insert in place with one hand while the nut and bolt are tightened. Some cutting tools, such as those in WO2009022757 A1, JP2004058193A, and CN 101391311 A, provide spring loaded clamps wherein a spring is provided to urge the clamp away from a position in which the clamp secures an insert to a tool holder body. While such arrangements may facilitate to some degree removal of cutting inserts from toolholder bodies, they can complicate installation of cutting inserts. Ordinarily, removal of the insert requires loosening of a bolt securing a clamp to a toolholder body and the spring merely assists a user by raising the clamp as the bolt is loosened. WO2006133378 shows a tool-less quick change tool holder provided for cutting inserts.

It is desirable to provide a toolholder that facilitates installation of a cutting insert in a manner that minimizes the possibility of the insert falling off of the tool holder during installation. It is also desirable to provide a toolholder that facilitates quick removal and replacement of cutting inserts on toolholders.

According to an aspect of the present invention, a toolholder is provided for use with a cutting insert having a clamping opening. The toolholder comprises a tool holder body and a clamp pivotably mounted to and contacting the toolholder body and pivotable between a first position in which a protrusion of the clamp is disposed in a position in which it is received in the clamping opening in the cutting insert to secure the cutting insert to the toolholder body and a second position in which the protrusion is spaced, relative to the toolholder, upwardly from the first position so that the cutting insert is not secured to the toolholder body by the protrusion, wherein a resilient member urges the clamp to the first position and resists pivoting of the clamp to the second position. The toolholder comprises a lever arm attachable to the clamp for pivoting the clamp toward the second position against a resisting force of the resilient member.

According to another aspect of the invention, a method for changing cutting inserts on a toolholder is provided, the cutting inserts being of a type having a clamping opening, the toolholder comprising a toolholder body and a clamp pivotably mounted to the toolholder body, said tool holder comprising a lever arm attachable to the clamp for pivoting the clamp toward the second position against a resisting force of the resilient member comprising pivoting the clamp, against a force of a resilient member, from a first position relative to the tool holder body in which a protrusion of the clamp is disposed in the clamping opening in a first cutting insert to secure the first cutting insert to the toolholder body to a second position in which the protrusion is spaced, relative to the toolholder, upwardly from the first position so that the first cutting insert is not secured to the toolholder body by the protrusion removing the first cutting insert from the tool holder body positioning a second cutting insert on the toolholder body pivoting the clamp from the second position to the first position under the force of the resilient member to secure the second cutting insert to the toolholder body.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
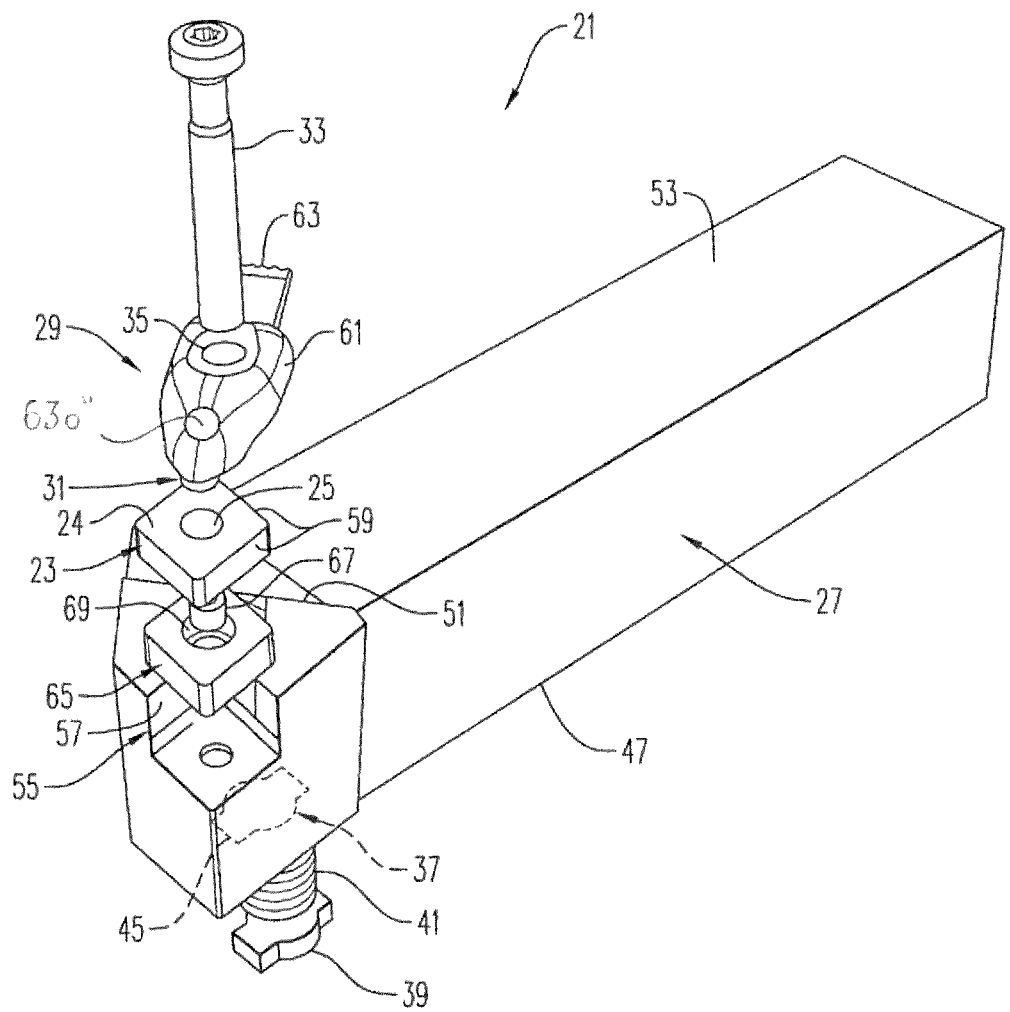
FIG. 1 is a perspective, exploded view of a tool including a toolholder according to an aspect of the present invention.

A toolholder 21 for use with a cutting insert 23 having a clamping opening 25 is seen in FIGS. 1-3E and comprises a toolholder body 27 and a clamp 29 pivotably mounted to the toolholder body. The clamp 29 is pivotable between a first position seen in FIG. 3A in which a protrusion 31 of the clamp is disposed in a position in which it is adapted to be received in the opening 25 in the cutting insert 23 to secure the cutting insert to the toolholder body 27 and a second position seen in FIG. 3C in which the protrusion is spaced, relative to the toolholder, upwardly from the first position so that the cutting insert is not secured to the toolholder body by the protrusion. The clamping opening 25 can be a through hole extending entirely through the insert 23, or a recess extending only part of the way through the insert. Ordinarily, the protrusion 31 disposed in the opening 25 of the insert together with an undersurface 32 of the clamp in contact with a top surface 24 of the insert secures the insert to the toolholder body 27.

The clamp 29 can be pivotably mounted to the toolholder body 27 by a bolt 33 extending through a through hole 35 (FIGS. 1 and 3A-3E) in the clamp and into an opening 37 (FIGS. 3A-3E) (seen in phantom in FIGS. 1 and 2), ordinarily a through hole, in the toolholder body. The bolt 33 is secured to the toolholder body by a nut 39. A resilient structure, herein after referred to as a spring 41 but, optionally, some other suitable form of resilient structure such as a compressible rubber block, is disposed between the nut 39 and a surface 43 (FIGS. 3A-3E) (seen in phantom in FIG. 2) of the toolholder body 27, ordinarily abutting the surface 43 on one end and the nut 39 on the other end of the spring. Ordinarily, the surface 43 of the toolholder body 27 is a stepped surface in the opening 37 in the toolholder body. Ordinarily, a portion 45 of the opening 37 between an exterior bottom surface 47 of the toolholder body and the surface 43 is non-circular and matches an exterior shape of the nut 39 so that the nut is non-rotatable in the opening 37. The protrusion 31 of the clamp and the bolt 33 may be parallel when the cutting insert is mounted in an operative position.

The bolt 33 and nut 39 may be but need not be adapted to be tightened on the toolholder 21 to a first tightened position (seen in FIG. 3A) in which the spring 41 is compressed so that the clamp 29 cannot be pivoted away from the first position toward the second position. The bolt 33 and nut 39 may be but need not be further adapted to be tightened on the toolholder 21 to at least an intermediate tightened position (seen in FIG. 3B) in which the spring 41 is compressed so that the clamp 29 cannot be pivoted away from the first position toward the second position to a distance equal to or greater than a length of the protrusion 31. The bolt 33 and nut 39 are ordinarily adapted to be tightened on the toolholder 21, while remaining attached to each other, to a second tightened position (seen in FIG. 3C-3E) in which the spring 41 is sufficiently compressible so that the clamp 29 can be pivoted toward the second position beyond the distance equal to the height of the protrusion 31.

The toolholder 21 can facilitate a highly convenient quick change operation. When the bolt 33 and nut 39 are in the second tightened position as seen in FIG. 3C-3E and thus permit pivoting of the clamp 29 to the second position in which the protrusion 31 is completely withdrawn from the clamping opening 25 in the insert 23, the insert can be easily withdrawn from or inserted into the toolholder body 27, usually into a specially constructed recess 55 in the toolholder body. By providing a spring 41 that is sufficiently difficult to compress, the force of the spring can urge the clamp 29 to the first position with sufficient force such that it is not necessary to further tighten the bolt 33 beyond the second tightened position (i.e., toward the intermediate or first tightened positions) to provide sufficient clamping force on the insert 23. At the same time, because the spring 41 can be compressed sufficiently to permit the clamp to pivot to the second position, the arrangement facilitates change of inserts 23. The quick change of inserts 23 can be greatly facilitated by providing a lever arm 63 integral with the clamp 29 (FIGS. 1-3E) or a lever arm 63' or 63" that is attachable to the clamp 29' (FIG. 4) via an opening 63o" in the clamp 29, 29'.

Figure 3A:
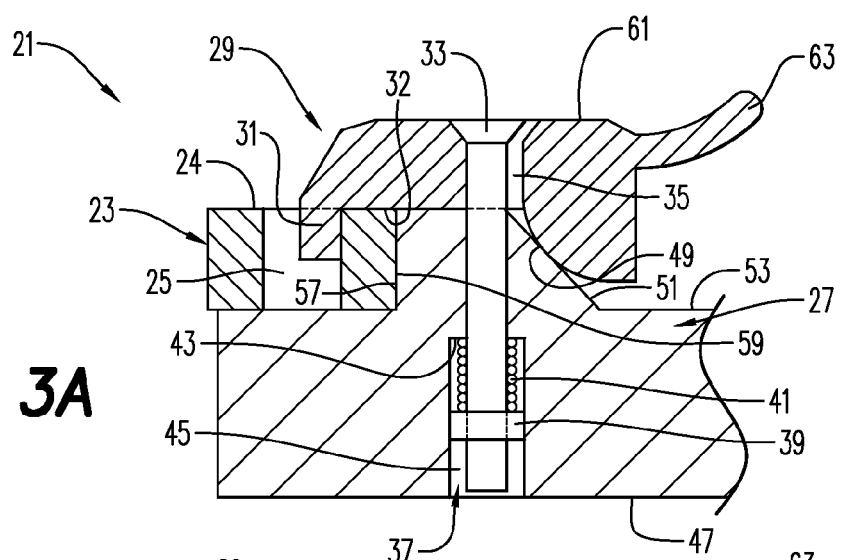
FIGS. 3A-3E are side, cross-sectional views of a tool including a toolholder according to an aspect of the present invention showing a clamp of the toolholder in different positions relative to a body of the toolholder.
Figure 3B:
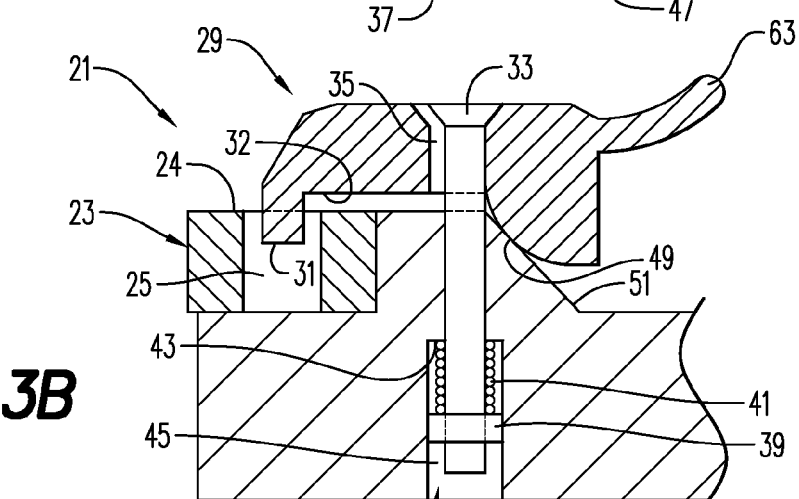

At the first tightened position seen in FIG. 3A, the bolt 33 and nut 39 can be tightened to a point where it is not possible to pivot the clamp 29 at all, and the insert 23 can be removed from the toolholder body 27 only by intentionally loosening the bolt and nut to the second tightened position. At the intermediate tightened position between the first and second tightened position as seen in FIG. 3B, the bolt 33 and nut 39 are tightened to a point where the spring 41 is compressible sufficiently to allow some pivoting or other movement of the clamp 29 but not sufficiently to allow the protrusion 31 to be entirely removed from the clamping opening 25 of the insert. This arrangement facilitates ensuring that the insert 23 is not inadvertently dropped from the toolholder body 27 when it is not considered desirable or necessary to tighten the bolt 33 and nut 39 to the first tightened position, while permitting the insert to be removed when the bolt and nut are loosened to the second tightened position.

The clamp 29 can comprise a non-flat surface, hereinafter referred to as a curved surface 49, in contact with a top surface portion 51 on the toolholder body 27. As seen from, e.g., FIGS. 3A-3E, the curved surface 49 of the clamp 29 may be able to roll along the top surface portion 51 when the clamp 29 is pivoted between the first and second positions. The clamp 29 may, however, pivot relative to the toolholder body 27 via other types of structures.

The top surface portion 51 can be disposed at an angle greater than 0° and less than 90° to a plane of a top surface 53 of the toolholder body 27. Usually, the angle is between 20° and 70°. The spring 41 can urge the head of the bolt 33 against the clamp 29 so that the curved surface 49 of the clamp slide along the top surface portion 41 and moves in a direction away from the bolt 33. At the same time, the protrusion 31 moves in a direction toward the bolt 33 and, if the protrusion is in the clamping opening 25 of an insert 23, the protrusion can draw the insert toward the bolt. Typically, the toolholder body 27 comprises a recess 55 for receiving the cutting insert 23. The recess 55 typically comprises at least one side insert abutment surface 57 for abutting against a side insert supporting surface 59 on the insert 23. When the nut 39 and bolt 33 are in the second tightened position, after the clamp is pivoted to the first position as seen in FIG. 3D, release of the compressive force of the spring 41 from the position seen in FIG. 3D can urge the head of the bolt 33 against the clamp 29 so that the curved surface 49 of the clamp slides along the top surface portion 41 and the protrusion 31 moves toward the side abutment surface 57 to the position seen in FIG. 3E in which the spring is less compressed, thus drawing a side insert supporting surface 59 on the insert 23 toward the side insert abutment surface 57 in the recess 55.

The top surface portion 51 can be disposed at an angle greater than 0° and less than 90° to a plane of a top surface 53 of the toolholder body 27. Usually, the angle is between 20° and 70°. When the bolt 33 and nut 39 are tightened from the second tightened position (FIGS. 3C-3E) to the first tightened position (FIG. 3A), the curved surface 49 of the clamp 29 can slide along the top surface portion 41 and move in a direction away from the bolt 33. At the same time, the protrusion 31 moves in a direction toward the bolt 33 and, if the protrusion is in the clamping opening 25 of an insert 23, the protrusion can draw the insert toward the bolt. Typically, the toolholder body 27 comprises a recess 55 for receiving the cutting insert 23. The recess 55 typically comprises at least one side insert abutment surface 57 for abutting against a side insert supporting surface 59 on the insert 23. The protrusion 31 moves toward the side abutment surface 57, i.e., from the position shown in FIG. 3B toward the position shown in FIG. 3A, when the bolt 33 and nut 39 are tightened from the second tightened position to the first tightened position and can draw the a side insert supporting surface 59 on the insert 23 toward the side insert abutment surface in the recess 55.

While the curved surface 49 need not actually be curved, it is desirable to shape the surface so that a minimal area of the surface will contact the top surface portion 51 of the toolholder body 27 to minimize the effects of friction between the surfaces. If desired, the shapes of the curved surface 49 and the top surface portion 51 can be reversed so that a curved surface is disposed on the toolholder body and an angled surface is disposed on the clamp. The through hole 35 in the clamp 29 is typically elongated in the direction toward the protrusion 31 to facilitate movement of the clamp relative to the toolholder body 27 when the bolt 33 and nut 39 are tightened.

Figure 2:
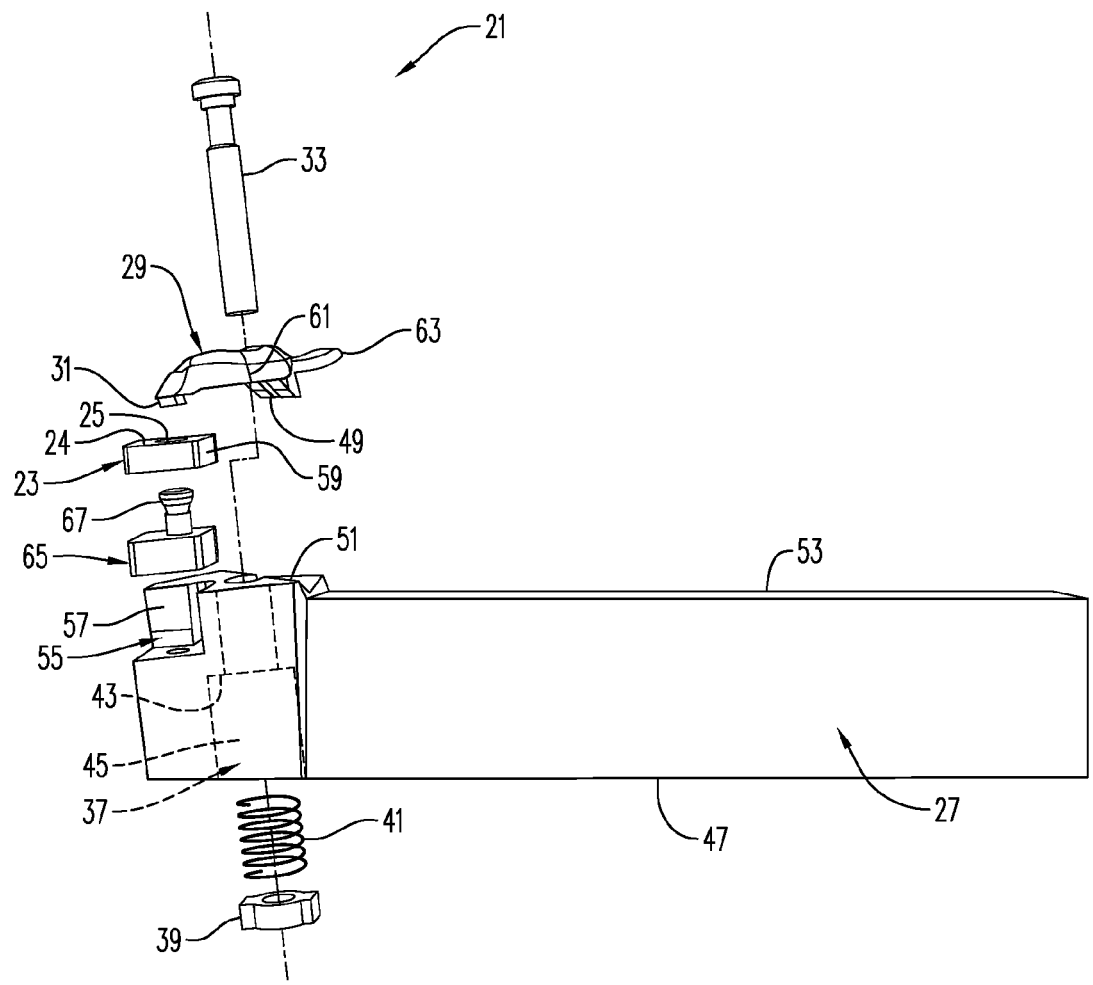
FIG. 2 is a side, exploded view of a tool including a toolholder according to an aspect of the present invention.
Figure 3C:
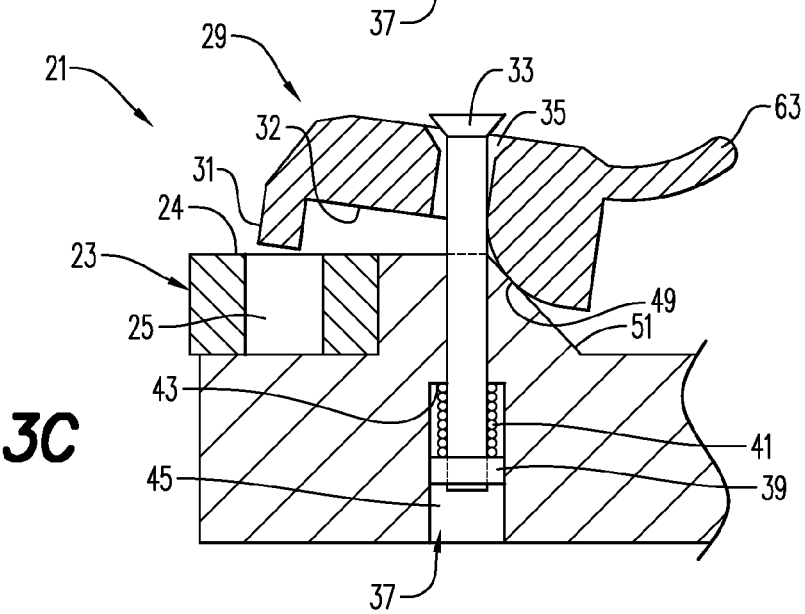
Figure 3D:
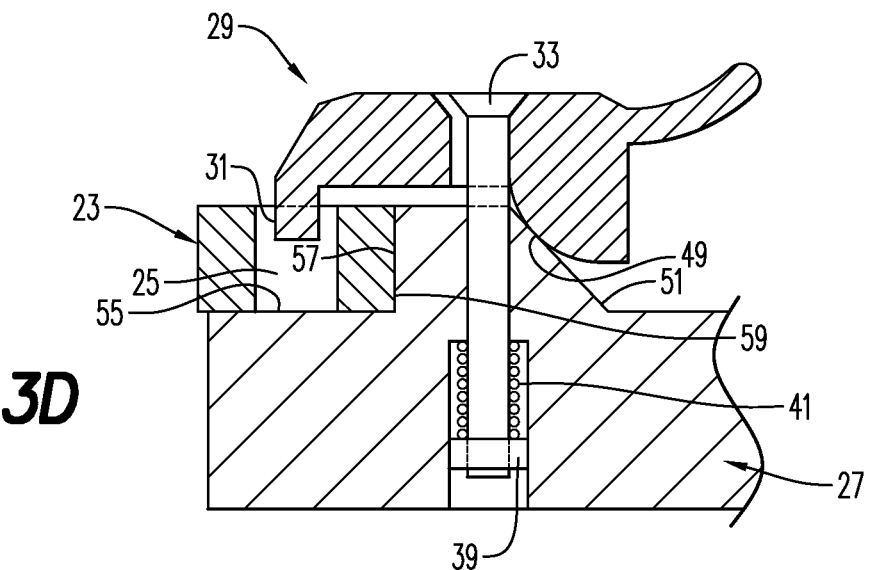
Figure 3E:
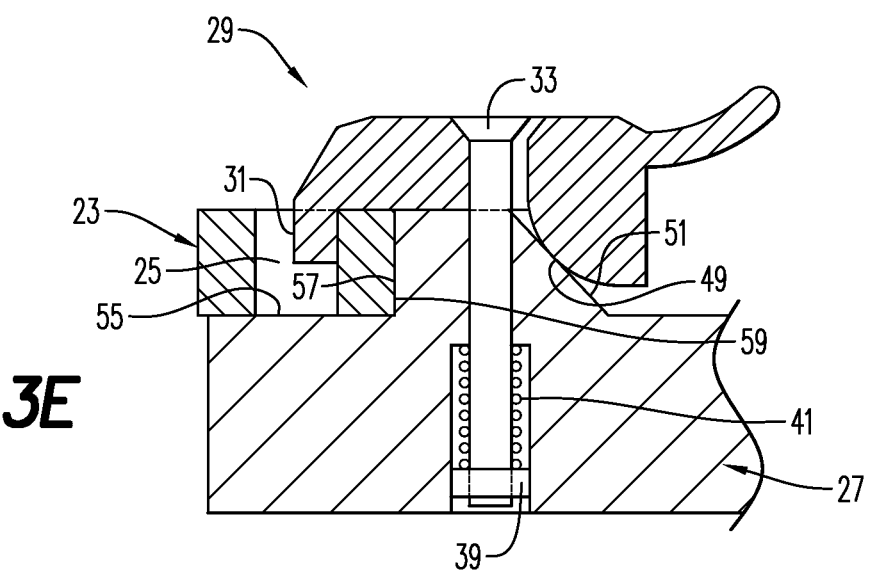
Figure 4:
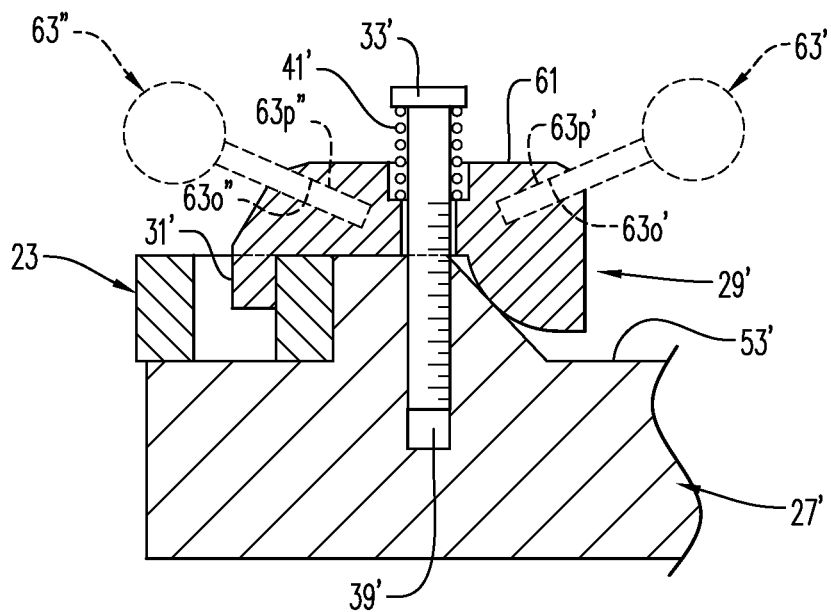
FIG. 4 is a side, cross-sectional view of a tool including a toolholder according to another aspect of the present invention.

As seen with reference to FIGS. 3A-3E, the clamp 29 is ordinarily pivotable between the first and second positions about a middle region or portion 61 (FIG. 3A) of the clamp. The protrusion 31 is disposed on one side of the middle portion 61 and a lever arm 63 is disposed on an opposite side of the middle portion. As seen in FIG. 3C, movement of the lever arm 63 toward the toolholder body 27 pivots the clamp 29 toward the second position. The lever arm 63 is illustrated in FIGS. 1-3E as being integrally formed with the rest of the clamp 29, however, as seen in FIG. 4, a lever arm 63' and/of 63" (shown in phantom) may be detachable, such as by providing an opening 63o' or 63o" (shown in phantom) in the clamp 29' for receiving a portion 63p' or 63p" of a separate lever (shown in phantom). The lever arm 63" is disposed on the same side of the middle portion 61 of the clamp 29' as the protrusion 31. The lever arm 63" pivots the clamp 29' to the second position by being raised relative to the toolholder body 27', while the lever arm 63' pivots the clamp by being pressed toward the toolholder body.

Although, in FIGS. 1-3E, the spring 41 is illustrated as being disposed around the bolt 33 between a nut 39 and the toolholder body 27, instead of providing a nut, as seen in FIG. 4, the bolt 33' may instead engage with a threaded opening 39' in the top surface 53' of the toolholder body 27' and the spring 41' or other resilient member may be disposed between, e.g., a head of the bolt and the clamp 29' or in any suitable configuration that will urge the clamp to the first position and resist movement toward the second position. The use of a particular lever structure is not limited to one or either of the spring and bolt arrangements shown in FIGS. 1-3E or FIG. 4.

The toolholder 21 facilitates quick changing of cutting inserts 23 on the toolholder. When the clamp 29 has been pivoted to the second position, the nut 39, bolt 33, and spring 41 can be configured so that, as long as the nut and bolt remain attached, the spring will urge the bolt against the clamp so that the clamp is automatically pivoted back toward the first position. If the spring 41 is sufficiently resistant to compression, it is possible to install an insert, use the insert in cutting operations, and remove the insert after it is worn without the need to unscrew the bolt 33 and nut 39 at all. To this end, the lever arm 63 can greatly facilitate quick opening of the clamp 29 to the second position from a first position when the nut 39 and bolt 33 are only tightened to the second tightened position. For example, though the nut 39 and bolt 33 might be in a second tightened position such that the spring 41 is capable of being compressed sufficiently to permit removal of the insert 23 from the toolholder body 27 upon pivoting the clamp 29, the spring might be sufficiently difficult to compress such that pivoting of the clamp to an extent necessary to remove the insert without use of the lever arm 63 or some external tool is extremely difficult if not impossible.

However, if the bolt 33 and nut 39 are tightened to the first tightened position (FIG. 3A) such that no or minimal movement of the clamp 29 from the first position toward second position is possible, the nut and bolt can be arranged so that the clamp can be pivoted to a second position (FIG. 3C) and permit replacement of the insert with only a few turns of the bolt. Further, the bolt 33, nut 39, and spring 41 can be arranged so that the spring urges the bolt against the clamp 29 with sufficient force to secure the insert 23 to the toolholder 21 even though the bolt and nut are not tightened to the first tightened position and the clamp is still pivotable or otherwise movable relative to the toolholder body to some degree short of the second position (or, of course, to the second position) without the need to further loosen the nut and bolt.

As seen in FIGS. 1 and 2, the toolholder 21 may comprise a shim 65 disposed in the recess 55 beneath the insert 23. The shim 65 can be secured to the toolholder body 27 by a clamping screw 67 that extends through an opening 69 in the shim 65. The shim 65 is not shown in FIGS. 3A-3E.

A method for changing cutting inserts 23 on a toolholder 21 is described in connection with FIGS. 3A-3E. The cutting inserts 23 are of a type having a clamping opening 25. The toolholder 21 comprises a toolholder body 27 and a clamp 29 pivotably mounted to the toolholder body. According to the method, the clamp 29 is pivoted from a first position relative to the toolholder body, seen in FIGS. 3A-3B and 3D-3E, in which a protrusion 31 of the clamp is disposed in the opening 25 in a first cutting insert 23 to secure the first cutting insert to the toolholder body to a second position, seen in FIG. 3C, in which the protrusion is spaced, relative to the toolholder, upwardly from the first position so that the first cutting insert is not secured to the toolholder body by the protrusion. Ordinarily this will involve pivoting the clamp 29 from the first position to the second position at least so that the protrusion 31 is no longer disposed in the opening 25 of the insert, usually a distance equal to or greater than a height of the protrusion.

After pivoting the clamp 29 to the second position, the first cutting insert 23 is removed from the toolholder body 27. A second cutting insert 23 is then positioned on the toolholder body 27. The clamp 29 is then pivoted from the second position to the first position to secure the second cutting insert 23 to the toolholder body 27.

Typically, the clamp 29 will be spring loaded by the spring 41 such that the clamp will tend to move to the first position and can only be moved to the second position against the force of the spring. A quick change aspect of the method can comprise maintaining the nut 39 and bolt 33 in the second tightened position in which the clamp 29 is pivotable against the force of the spring 41 from the first position seen in FIGS. 3D and 3E to the second position seen in FIG. 3C. The pivoting of the clamp 29 from the first position toward the second position can be facilitated by pressing a lever arm 63 (or 63' (FIG. 4) on the clamp toward the toolholder body 27 or raising a lever 63" (FIG. 4) away from the toolholder body 27'.

After installation of an insert 23 in the recess 55 of the toolholder body 27, the clamp 29 can then be pivoted back to the first position. Ordinarily, the clamp 29 automatically pivots to the first position under the force of the spring 41. The spring 41 can apply sufficient force to the clamp 29 that, after the clamp is pivoted to the first position as seen in FIG. 3D, the force of the spring urges a curved surface 49 of the clamp to slide away from the bolt 33 along an angled top surface portion 51 of the top surface 53 of the toolholder body 27. As the curved surface 49 of the clamp slides away from the bolt, the protrusion 31 of the clamp slides toward the bolt and can be arranged to contact the interior surface of the clamping opening 25 and draw the insert 23 toward the bolt so that the side supporting surface 59 of the insert is drawn into contact with the side abutment surface 57 of the recess 55. The through hole 35 in the clamp 29 will ordinarily be elongated so that the clamp can move laterally relative to an axis of the bolt, and also so that the clamp is pivotable relative to the bolt.

The method can alternatively, comprise, prior to pivoting the clamp 29 from the first position to the second position, loosening the nut 39 and bolt 33 that compresses the spring 41 and secures the clamp to the toolholder body from the first tightened position (FIG. 3A), in which first tightened position the spring is compressed and the clamp cannot be pivoted away from the first position toward the second position to a distance equal to or greater than a length of the protrusion, e.g., as shown in FIG. 3B, to a second tightened position seen in FIG. 3C in which the bolt and nut remain attached to each other and in which compression of the spring is sufficiently relieved so that the clamp can be pivoted toward the second position beyond the distance equal to the height of the protrusion.

When the nut 39 and bolt 33 that compress the spring 41 are in a position as in FIG. 3C or 3B and are then tightened so that the nut and bolt and moved toward or to the first tightened position shown in FIG. 3A, the clamp 29 can be moved relative to the bolt so that the protrusion 31 is moved toward the bolt. This can be achieved by providing an angled surface such as the top surface portion 51 of the top surface 53 of the toolholder body 27 along which a contacting surface of the clamp 29, such as the curved surface 49, can slide as the nut 39 and bolt 33 are tightened.

The claimed structure offers advantages including avoiding hazards for the operator and achieving a safe quick change of inserts. In addition, the claimed structure permits the use of several ISO standardized clamping parts which is not possible in the complex arrangements of prior toolholders.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in EP Patent Application No. 12188189.0, from which this application claims priority, are incorporated herein by reference.

The invention claimed is:

1. A toolholder for use with a cutting insert having a clamping opening, comprising:
   a tool holder body;
   a clamp pivotably mounted to and contacting the toolholder body and pivotable between a first position in which a protrusion of the clamp is disposed in a position in which it is received in the clamping opening in the cutting insert to secure the cutting insert to the toolholder body and a second position in which the protrusion is spaced, relative to the toolholder, upwardly from the first position so that the cutting insert is not secured to the toolholder body by the protrusion, wherein a resilient member urges the clamp to the first position and resists pivoting of the clamp to the second position;
   a lever arm attachable to the clamp for pivoting the clamp toward the second position against a resisting force of the resilient member; and
   a bolt that secures the clamp to the toolholder body, wherein the bolt is secured to the toolholder body by a nut, the resilient member being disposed between the nut and a surface of the toolholder body.

2. A toolholder for use with a cutting insert having a clamping opening, comprising:
   a tool holder body;
   a clamp pivotably mounted to and contacting the toolholder body and pivotable between a first position in which a protrusion of the clamp is disposed in a position in which it is received in the clamping opening in the cutting insert to secure the cutting insert to the toolholder body and a second position in which the protrusion is spaced, relative to the toolholder, upwardly from the first position so that the cutting insert is not secured to the toolholder body by the protrusion, wherein a resilient member urges the clamp to the first position and resists pivoting of the clamp to the second position;
   a lever arm attachable to the clamp for pivoting the clamp toward the second position against a resisting force of the resilient member; and
   a bolt that secures the clamp to the toolholder body, wherein threads on the bolt mate with threads in a threaded opening in the toolholder body, the resilient member being disposed between a head of the bolt and the clamp.

3. A toolholder for use with a cutting insert having a clamping opening, comprising:
   a tool holder body;
   a clamp pivotably mounted to and contacting the toolholder body and pivotable between a first position in which a protrusion of the clamp is disposed in a position in which it is received in the clamping opening in the cutting insert to secure the cutting insert to the toolholder body and a second position in which the protrusion is spaced, relative to the toolholder, upwardly from the first position so that the cutting insert is not secured to the toolholder body by the protrusion, wherein a resilient member urges the clamp to the first position and resists pivoting of the clamp to the second position;
   a lever arm attachable to the clamp for pivoting the clamp toward the second position against a resisting force of the resilient member; and
   a bolt that secures the clamp to the toolholder body, wherein the bolt is secured to the toolholder body by a nut, the bolt and nut being tightened on the toolholder to a position in which the resilient member is compressed so that the clamp cannot be pivoted away from the first position toward the second position to a distance equal to or greater than a length of the protrusion.

4. The toolholder as set forth in claim 1, wherein the bolt and nut are tightened on the toolholder, while remaining attached to each other, to a position in which the resilient member is sufficiently compressible so that the clamp can be pivoted toward the second position beyond the distance equal to the height of the protrusion.

5. The toolholder as set forth in claim 1, wherein the clamp includes a curved surface in contact with a top surface portion on the toolholder body, the curved surface of the clamp rolling along the top surface portion when the clamp is pivoted between the first and second positions.

6. The tool holder as set forth in claim 5, wherein the top surface portion is disposed at an angle greater than 0° and less than 90° to a plane of a top surface of the toolholder body, wherein when the bolt and nut are pivoted from the second position to the first position, a force applied by the resilient member causes the curved surface of the clamp to slide along the top surface portion and move in a direction away from the bolt and causes the protrusion to move in a direction toward the bolt.

7. The toolholder as set forth in claim 6, wherein the toolholder body includes a recess for receiving the cutting insert, the recess having at least one side insert abutment surface for abutting against a side insert supporting surface on the insert, the protrusion moving toward the side abutment surface when the resilient member causes the curved surface of the clamp to slide along the top surface portion and move in the direction away from the bolt and causes the protrusion to move in the direction toward the bolt.

8. A method for changing cutting inserts on a toolholder, the cutting inserts having a clamping opening, the toolholder including a toolholder body, a clamp pivotably mounted to the toolholder body, and a lever arm attachable to the clamp, the method comprising:

pivoting the clamp against a force of a resilient member, from a first position relative to the toolholder body in which a protrusion of the clamp is disposed in the clamping opening in a first cutting insert to secure the first cutting insert to the toolholder body to a second position in which the protrusion is spaced, relative to the toolholder, upwardly from the first position so that the first cutting insert is not secured to the toolholder body by the protrusion;

removing the first cutting insert from the tool holder body;

positioning a second cutting insert on the toolholder body;

pivoting the clamp from the second position to the first position under the force of the resilient member to secure the second cutting insert to the toolholder body; and pivoting the clamp from the first position to the second position by raising the lever arm on the clamp away from the toolholder body.

9. The method as set forth in claim 8, further comprising pivoting the clamp from the first position to the second position by pressing the lever arm on the clamp toward the toolholder body.

10. The method as set forth in claim 8, further comprising tightening a bolt securing the clamp to the toolholder body to a position in which the clamp cannot be pivoted to the second position.

* * * * *